(12) United States Patent
Fors

(10) Patent No.: US 10,161,496 B2
(45) Date of Patent: Dec. 25, 2018

(54) METHOD AND DEVICE FOR ADJUSTING THE PLAY OF A GEAR TRANSMISSION

(71) Applicant: SCANIA CV AB, Södertälje (SE)

(72) Inventor: Stefan Fors, Tullinge (SE)

(73) Assignee: SCANIA CV AB (SE)

( * ) Notice: Subject to any disclaimer, the term of this patent is extended or adjusted under 35 U.S.C. 154(b) by 128 days.

(21) Appl. No.: 14/900,667

(22) PCT Filed: Jun. 12, 2014

(86) PCT No.: PCT/SE2014/050708
§ 371 (c)(1),
(2) Date: Dec. 22, 2015

(87) PCT Pub. No.: WO2014/209200
PCT Pub. Date: Dec. 31, 2014

(65) Prior Publication Data
US 2016/0146327 A1      May 26, 2016

(30) Foreign Application Priority Data

Jun. 27, 2013    (SE) ..................................... 1350782

(51) Int. Cl.
*F16H 55/18*    (2006.01)
*F16H 57/022*    (2012.01)

(52) U.S. Cl.
CPC ........... *F16H 55/18* (2013.01); *F16H 57/022* (2013.01); *F16H 2057/0224* (2013.01)

(58) Field of Classification Search
CPC ........ F16H 55/18; F16H 57/022; F16H 55/28; F16H 2057/0224
See application file for complete search history.

(56) References Cited

U.S. PATENT DOCUMENTS 3,502,059 A * 3/1970 Davis ........................ F01L 1/02
                                            123/195 R
3,572,157 A * 3/1971 Adams et al. ........... B62D 3/12
                                            74/409
(Continued)

FOREIGN PATENT DOCUMENTS

EP     0471 160 A1    2/1992
EP     0 707 958 A1    4/1996
(Continued)

OTHER PUBLICATIONS

Korean Office Action dated Feb. 1, 2017 in corresponding Korean Patent Application No. 10-2016-7002132.
(Continued)

*Primary Examiner* — Zakaria Elahmadi
(74) *Attorney, Agent, or Firm* — Ostrolenk Faber LLP

(57) ABSTRACT

A clearance adjustment mechanism (14) for a gearwheel transmission (12) includes at least one gearwheel (16, 66) with a centerline (39, 67), and a hole (36) in the gearwheel (16, 66) and running substantially parallel with and radially offset from the centerline (39, 67). A spigot (46) insertable in the hole (36) has a threaded portion (48) and a conical portion (50) and fits in the hole (36) such that the centerline (39, 67) moves radially in parallel with the spigot (46) when the spigot is turned in the hole (36). Also a gearwheel transmission (12) with such a clearance adjustment mechanism (14), a combustion engine (4) with such a gearwheel transmission (12), a vehicle (1) with such a combustion engine (4), and a method for adjusting the flank clearance in such a gearwheel transmission (12).

15 Claims, 7 Drawing Sheets

(56) References Cited

U.S. PATENT DOCUMENTS

| | | | | | |
|---|---|---|---|---|---|
| 4,488,447 | A | * | 12/1984 | Gebhardt | ............... B65H 19/30 |
| | | | | | 74/15.63 |
| 4,660,432 | A | * | 4/1987 | Damas | .................... F16H 55/18 |
| | | | | | 464/85 |
| 5,152,186 | A | * | 10/1992 | Dettinger | .............. B41F 13/012 |
| | | | | | 74/409 |
| 7,302,873 | B2 | * | 12/2007 | Nett | ........................ F16H 1/222 |
| | | | | | 74/400 |
| 2003/0136212 | A1 | * | 7/2003 | Allen | ..................... F16H 55/18 |
| | | | | | 74/460 |

FOREIGN PATENT DOCUMENTS

| | | |
|---|---|---|
| FR | 2 508 973 A1 | 1/1983 |
| GB | 927 741 A | 6/1963 |
| KR | 10-2011-0112652 | 10/2011 |
| KR | 10-2012-0068195 | 6/2012 |
| WO | WO 93/00530 A1 | 1/1993 |
| WO | WO 9300530 A1 * | 1/1993 ........... F16H 57/022 |

OTHER PUBLICATIONS

International Search Report dated Sep. 9, 2014 issued in corresponding International patent application No. PCT/SE2014/050708.
EP Communication pursuant to Article 94(3) EPC issued Jul. 31, 2018.

\* cited by examiner

METHOD AND DEVICE FOR ADJUSTING THE PLAY OF A GEAR TRANSMISSION

CROSS-REFERENCE TO RELATED APPLICATIONS

The present application is a 35 U.S.C. §§ 371 national phase conversion of PCT/SE2014/050708, filed Jun. 12, 2014, which claims priority of Swedish Patent Application No. 1350782-7, filed Jun. 27, 2013, the contents of which are incorporated by reference herein. The PCT International Application was published in the English language.

TECHNICAL FIELD

The present invention relates to a clearance adjustment mechanism for a gearwheel transmission, a gearwheel transmission with a clearance adjustment mechanism, a combustion engine with a gearwheel transmission, a vehicle with a combustion engine and a method for adjusting the flank clearance in a gearwheel transmission all according to the invention.

TECHNICAL BACKGROUND

The mutual tooth engagement of gearwheels fitted without clearance occurs at their respective reference or pitch circles. The between-centers distance (the center distance) between two gearwheels fitted without clearance will then be the sum of the radii of their respective reference or pitch circles. To cater for thermal expansion, the center distance between the gearwheels is usually increased somewhat to create a flank clearance between them. Otherwise, such expansion would cause large radial forces between them. Excessive radial forces between the gearwheels would increase the load on each gearwheel bearing, shortening its service life. Large radial forces would also increase the wear on the flanks of the gearwheels' teeth, potentially leading to damage to the teeth. The amount of flank clearance also affects the transmission ratio between the gearwheels. To achieve a constant ratio, the contact perpendicular of a gear pair in engagement should always run through a fixed point on a straight line between their axes. The noise generated by the gearwheel transmission will also be affected by the flank clearance.

Gearwheel transmissions are used in different contexts in a large number of different mechanical configurations. The flank clearance between the cooperating gearwheels in such configurations is of great significance for the achievement of a functioning and reliable configuration.

A gearwheel transmission used to drive the camshaft of a combustion engine has to fulfil a number of factors. To achieve precise opening and closing times for the engine's valves, the flank clearance between the cooperating gearwheels must be adjusted accurately. At the same time, as quiet a transmission as possible is desired with a view to preventing noise which might adversely affect the surroundings. If the engine is intended to power a vehicle, there are in certain countries legal requirements about how high a noise level the engine is allowed to generate.

The gearwheel transmission used to drive the camshaft often comprises a number of gearwheels in mutual engagement. If the engine has one or more overhead camshafts, the distance between its crankshaft and the camshafts will be considerable. The transmission between them has therefore to comprise a number of gearwheels. The crankshaft is fitted in the engine block and the overhead camshafts are fitted in the cylinder head. The manufacturing tolerances of engine blocks and cylinder heads and the respective seals and gaskets between these components in the fitted state are such that the distance between crankshaft and camshafts will vary between engines of the same type and make. This means that the center distances of the gearwheels will vary because the engine's components are manufactured with a certain tolerance.

Compression of the cylinder head gasket may for example occur during normal operation of the engine. The engine's servicing and repair may entail replacement or reconditioning, e.g. by grinding, of the cylinder head. The center distances of the gearwheels may therefore change both during operation and as a result of servicing and repair of the engine.

A known practice is to provide gearwheel systems with clearance adjustment mechanisms so that the flank clearance settings between the cooperating gearwheels can be altered to cater for the way their flank clearance is affected by normal operation, wear, servicing and repairs.

Another known practice is to employ clearance adjustment methods whereby an intermediate pinion is provided on an adjustable bracket for adjusting the flank clearance between the cooperating gearwheels.

WO9300530 refers to a mechanism for adjusting the center distance between gearwheels in a gearwheel transmission between a combustion engine's crankshaft and camshaft. An intermediate gearwheel can be turned about an axis of rotation when screws fixing it are slackened. The gearwheel has oblong recesses in which the fixing screws can travel. When the center distance is correctly adjusted, the fixing screws are tightened so that the position of the gearwheel is fixed relative to the engine block.

U.S. Pat. No. 3,502,059 refers to an adjusting mechanism for gearwheels in a gearwheel transmission between a combustion engine's crankshaft and camshaft. An intermediate gearwheel is provided on a pivotable bracket. When a number of bolts fastening it are released, the bracket can be turned about a pivot pin. When the intermediate gearwheel is correctly adjusted, the fastening bolts are tightened so that the positions of the bracket and the intermediate gearwheel are fixed relative to the engine's cylinder head.

SUMMARY OF THE INVENTION

Despite known solutions in this field, there is a need to further develop a clearance adjustment mechanism which is of simple construction and easy to use.

There is also a need to further develop a clearance adjustment mechanism whose manufacture involves a small material requirement and which has a low manufacturing cost.

The object of the present invention is to propose a clearance adjustment mechanism which is of simple construction.

Another object of the invention is to propose a clearance adjustment mechanism which is easy to use.

A further object of the invention is to propose a clearance adjustment mechanism whose manufacture involves a small material requirement.

A further object of the invention is to propose a clearance adjustment mechanism which has a low manufacturing cost.

These objects are achieved with a clearance adjustment mechanism of the kind mentioned in the introduction, with a gearwheel transmission, a combustion engine, a vehicle and a method for adjusting the flank clearance in a gearwheel transmission according to the invention.

A spigot which comprises a threaded portion and a conical portion and is inserted in a hole in the gearwheel makes it easy for the flank clearance to be set by turning the spigot in the hole so that the centerline of the gearwheel moves in parallel. The spigot is of simple construction and easy to use to adjust the flank clearance. Manufacturing the spigot involves a small material requirement, which also means that it has a low manufacturing cost.

In one embodiment the conical portion has a tip angle within the range 5°-170°, and preferably within the range 135°-45°. Such a tip angle causes movement of the gearwheel during flank clearance setting and ensures parallel movement of the gearwheel. Oblique setting of the gearwheel would result in incorrect flank clearance after the adjustment.

In a further embodiment the threaded portion has a pitch within the range 0.2 mm-2 mm, preferably within the range 0.5 mm-1.5 mm. Such a thread pitch results in very accurate flank clearance adjustment, since the magnitude of the pitch affects the axial movement of the turning spigot. The axial movement of the spigot itself affects the parallel movement of the gearwheel.

In a further embodiment the tip angle and the thread pitch are such that when the spigot is turned 360° in the hole, the parallel movement of the centerline will be within the range 1 μm-2 mm, preferably within the range 5 μm-1 mm. Such a tip angle and thread pitch result in very accurate flank clearance adjustment, since the magnitude of the pitch affects the axial movement of the turning spigot. The axial movement of the spigot itself affects the parallel movement of the gearwheel.

In a further embodiment a pivot pin is arranged to extend through the gearwheel and parallel with the centerline so that centerline moves in parallel in a circular movement about the pivot pin when the spigot is turned in the hole. Such a pivot pin makes it possible during flank clearance adjustment for the gearwheel to be moved in a controlled direction, affecting the accuracy of the flank clearance adjustment and allowing different flank clearance adjustments to two or more gearwheels at the same time.

In a further embodiment there is in the hole a conical step configured to cooperate with the conical portion of the spigot during the parallel movement of the centerline. Such a conical step in the hole affects the accuracy of the flank clearance adjustment, since the surfaces of the conical portion of the spigot and the conical step in the hole will cooperate with one another when the spigot is turned in the hole during flank clearance adjustment.

In a further embodiment the conical step in the hole has a tip angle substantially coinciding with the angle of the spigot's conical portion. This further increases the accuracy of the flank clearance adjustment.

In a further embodiment the spigot's threaded portion fits in a threaded aperture in a frame element on which the gearwheel is attachable. When the spigot is turned, its threaded portion will turn in the threaded aperture of the frame element. The spigot will thus move axially so that its conical portion causes the gearwheel to be pressed axially against the frame element while at the same time being moved radially. The gearwheel's centerline will therefore move in parallel, resulting in very accurate flank clearance adjustment.

In a further embodiment the hole has an internal thread adapted to cooperating with the threaded portion of the screw. This simplifies the manufacture of the clearance adjustment mechanism.

In a further embodiment the spigot's conical portion is configured to cooperate, during the centerline's parallel movement, with a conical recess in a frame element on which the gearwheel is attachable. The conical recess in the frame element and the thread in the hole simplify the manufacture of the clearance adjustment mechanism.

In a further embodiment the gearwheel transmission is arranged to transfer torque and rotation from a crankshaft to at least one camshaft of a combustion engine. Such a transmission is situated between an engine's crankshaft and camshaft makes it easy to adjust the flank clearance between its gearwheels. The simple construction of the spigot means that the flank clearance can be adjusted very easily and accurately.

The method for adjusting the flank clearance according to the invention comprises the steps of inserting the spigot in the hole and turning it so that the centerline moves in parallel. Such a method results in very easy and accurate flank clearance adjustment which may be achieved with ordinary standard tools.

In one embodiment of the method a predetermined torque is applied to the spigot, resulting in a parallel movement of the gearwheel's centerline with respect to radial direction movement of the spigot. The spigot is then turned through a predetermined angle in the opposite direction to the torque applied, so that the centerline moves in parallel to radial direction movement of the spigot in the opposite direction to the preceding parallel movement. It is thus possible to achieve easy and accurate flank clearance adjustment with simple standard tools, e.g. a torque socket wrench. The parallel movement of the first centerline in the opposite direction may be by force of gravity acting upon the first gearwheel. Alternatively, the spring force from a spring device may move the centerline in parallel in the opposite direction.

In a further embodiment of the method the gearwheel is fixed on a frame element and the spigot is removed from the hole. As the spigot is only to be used during flank clearance adjustment, it may be removed when the adjustment has been completed, reducing the weight of the gearwheel and the frame element, e.g. a combustion engine, to which the gearwheel is attached.

Further advantages of the invention are indicated by the detailed description set out below.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
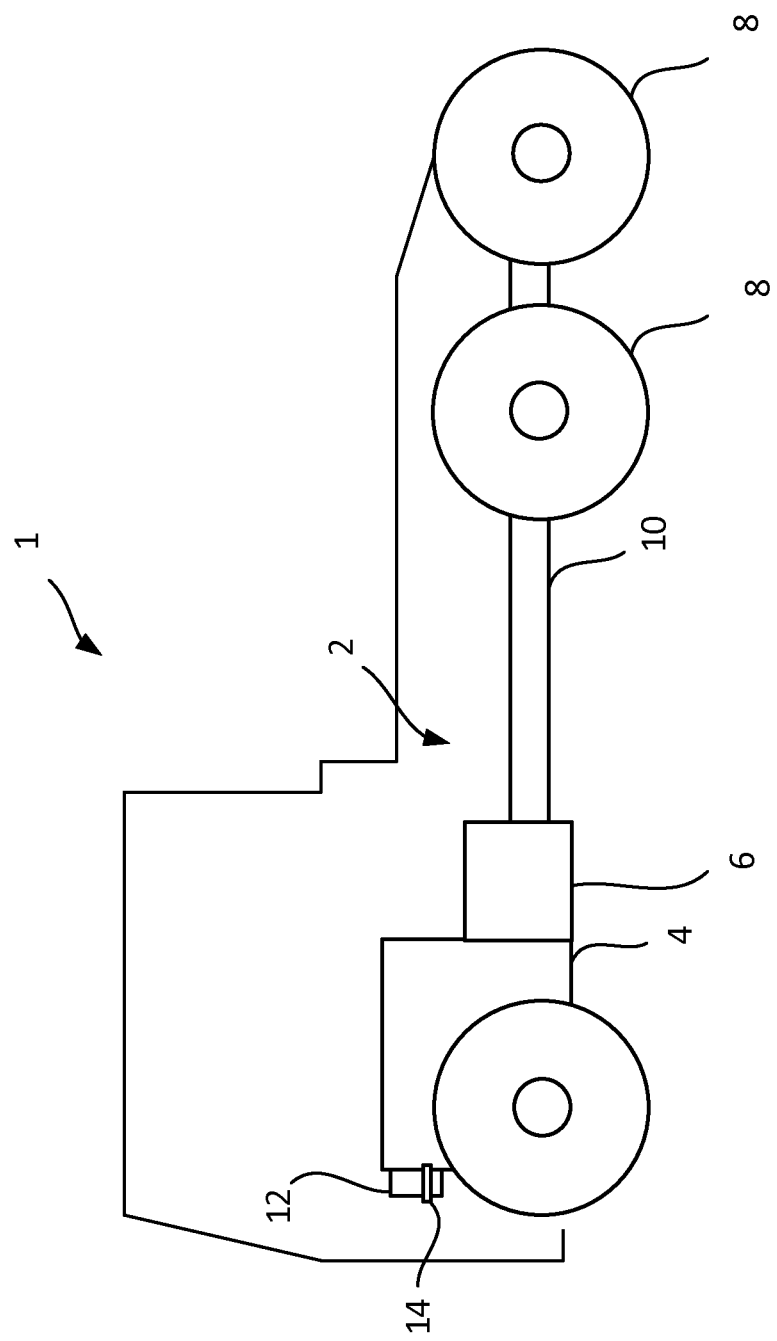
FIG. 1 depicts a schematic sideview of a vehicle according to the present invention.

FIG. 1 depicts schematically a side view of a vehicle 1 comprising a powertrain 2 with a combustion engine 4 which is connected to a gearbox 6. The gearbox is further connected to the vehicle's tractive wheels 8 via a universal shaft 10. The engine is provided with a gearwheel transmission 12 and a clearance adjustment mechanism 14.

Figure 2:
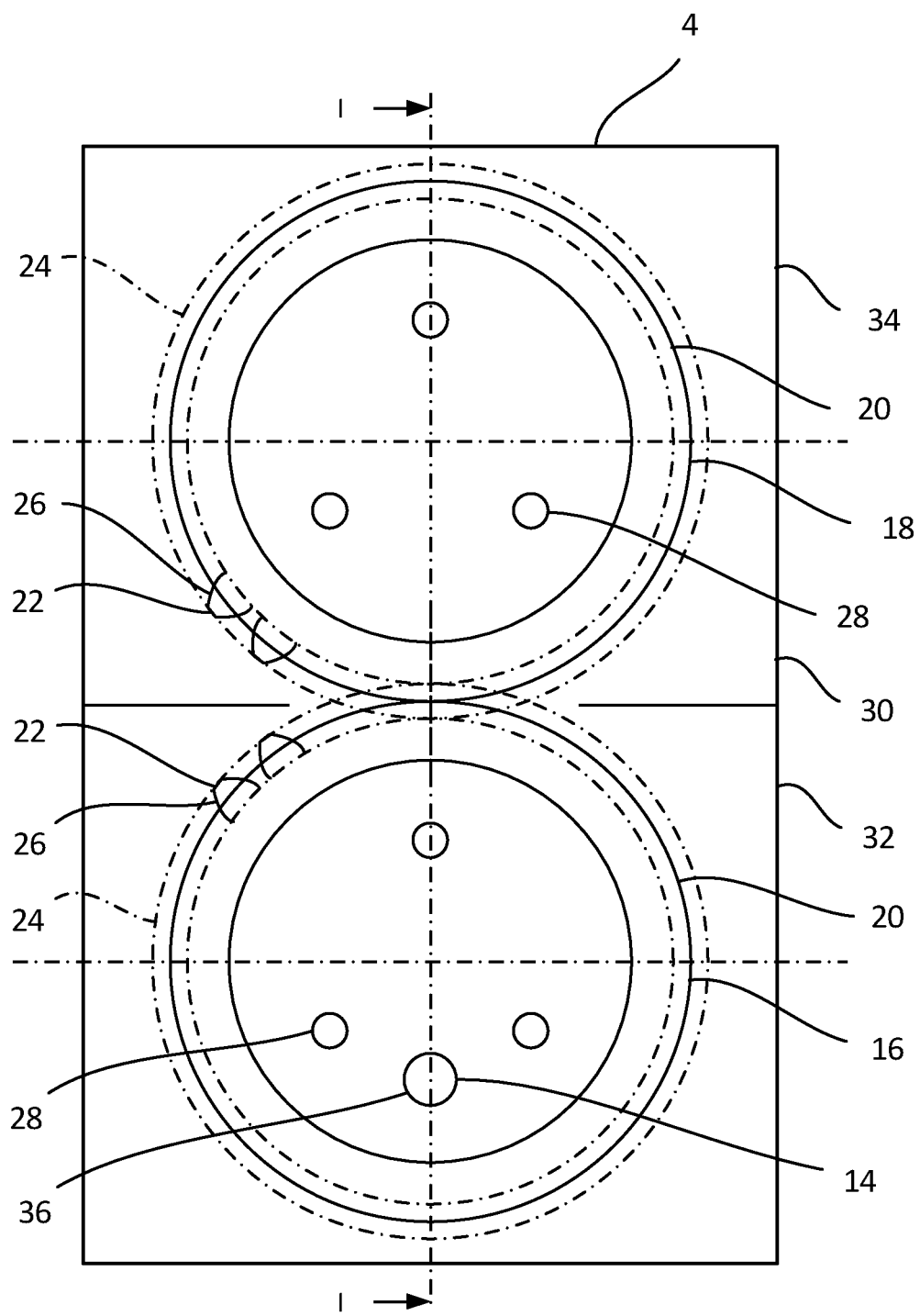
FIG. 2 depicts a plan view of a gearwheel transmission with a clearance adjustment mechanism according to the present invention.

FIG. 2 depicts a plan view of a gearwheel transmission 12 with a clearance adjustment mechanism 14 according to the present invention. The transmission 12 in FIG. 2 comprises a first gearwheel 16 and a second gearwheel 18 which engage with one another at their respective reference or pitch circles 20. The center distance between the two gearwheels 16, 18, which are fitted without a flank clearance, will be the sum of the radii of their respective reference or pitch circles 20. Thus the gearwheels 16, 18 in FIG. 2 are shown fitted without flank clearance.

FIG. 2 depicts only a pair of teeth 22 per gearwheel 16, 18. The chain-dotted circles 24 schematically represent teeth 22 along the whole circumference of the two gearwheels. To cater for thermal expansion, the center distance between the gearwheels is usually increased somewhat to create a flank clearance between them. Otherwise, such expansion would cause large radial forces between them. Excessive radial forces between the two gearwheels would increase the load on each gearwheel bearing, shortening its service life. Large radial forces would also increase the wear on the flanks 26 of the teeth 22, potentially leading to damage to the teeth.

Figure 3:
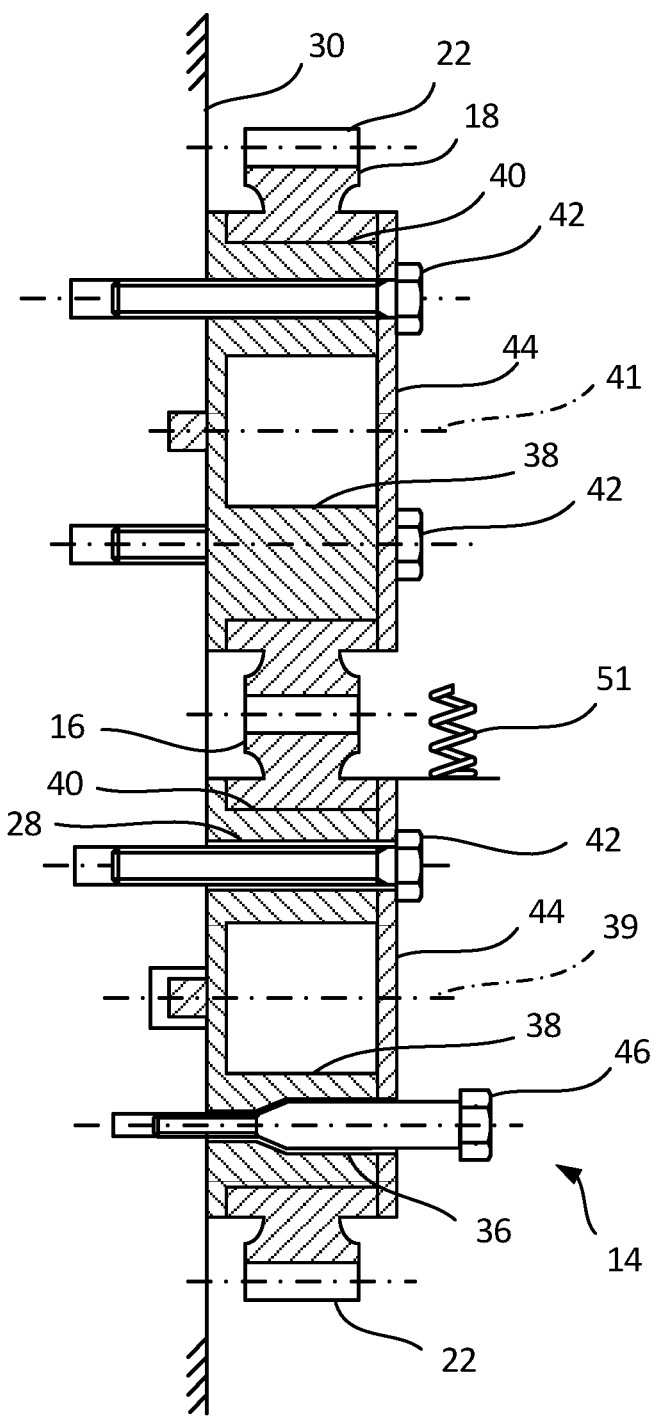
FIG. 3 depicts a sectional view along the line I-I in FIG. 2.

FIG. 3 depicts a sectional view along the line I-I in FIG. 2. The first and second gearwheels 16, 18 are annular and each has a respective hub 38. The first gearwheel 16 has a first centerline 39 and a second gearwheel has a second centerline 41. The two gearwheels are rotatable on their respective non-rotatable hubs 38 via plain bearings 40.

The two gearwheels 16, 18 are each provided with fitting holes 28 so that they can be mounted on a frame element 30, e.g. the engine block 32 or the cylinder head 34 of a combustion engine 4. The first gearwheel 16 in FIG. 2 is provided with a further hole 36 which serves as part of the clearance adjustment mechanism 14. The hubs are mounted on the frame element 30 by means of screws 42. The gearwheels 16, 18 are each provided with an assembly plate 44 to ensure that they are fixed axially. The first gearwheel 16 is mounted on the frame element 30 in such a way that the position of the first centerline 39 can be adjusted radially relative to the frame element. The hole 36 in the hub of the first gearwheel runs substantially parallel with the first centerline 39.

Figure 4:
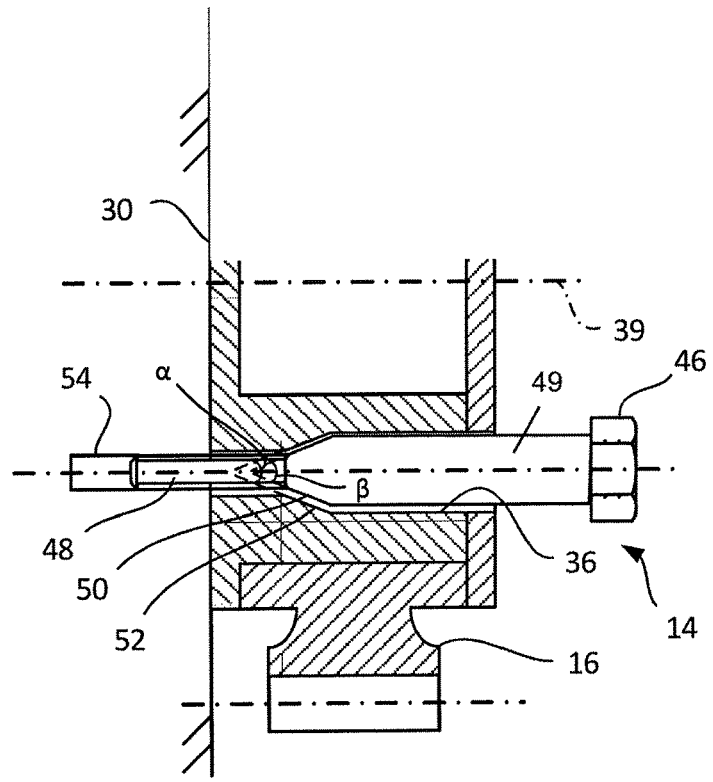
FIG. 4 depicts a sectional view of the clearance adjustment mechanism according to a first embodiment of the present invention.

A spigot 46 which forms part of the clearance adjustment mechanism 14 is insertable in the hole 36 in the hubs and into the frame element 30 and is provided with a threaded portion 48 (a first portion), a second portion 49, and a conical portion 50. FIG. 3 and FIG. 4 depict the spigot 46 and the hole 36 in a first embodiment of the invention.

The spigot is insertable in the hole 36 in such a way that the first centerline 39 of the first gearwheel 16 moves in parallel when the spigot is turned in the hole. To allow radial movement of the first gearwheel, the diameter of its fitting holes 28 is greater than that of the screws 42 which fasten it to the frame element 38.

The spigot 46 makes it possible for the center distance of the gearwheels 16, 18, and hence also the flank clearance, to be set by turning the spigot in the hole 36 so that the first centerline 39 of the first gearwheel 16 moves in parallel.

The first gearwheel 16 may be provided with a spring device 51 whose force has to be overcome by the spigot 46 during flank clearance adjustment.

FIG. 4 depicts a sectional view of a clearance adjustment mechanism 14 according to the first embodiment. The hole 36 has a conical step 52 configured to cooperate with the conical portion 50 of the spigot 46 during the parallel movement of the first centerline 39. The tip angle $\alpha$ of the conical step in the hole 36 preferably coincides with the tip angle $\beta$ of the spigot's conical portion 50 so that the surfaces of the conical portion of the spigot and the conical step in the hole abut against, and cooperate with, one another when the spigot is turned in the hole 36 during flank clearance adjustment. The result is accurate flank clearance adjustment.

In the first embodiment, the threaded portion 48 of the spigot is fitted in a threaded aperture 54 in the frame element 30. When the spigot is turned, its threaded portion 48 will therefore turn in the frame element's threaded aperture 54. The spigot will thus move axially, with the result that its conical portion 50 causes the first gearwheel 16 to be pressed axially against the frame element at the same time as being moved radially. The first centerline 39 of the first gearwheel will therefore move in parallel, resulting in very accurate flank clearance adjustment. Oblique setting of the first gearwheel 16 relative to the second gearwheel 18 during clearance adjustment would cause incorrect flank clearance.

The spigot's conical portion 50 has a tip angle $\beta$ within the range 5°-170°, preferably within the range 135°-45°. Such a tip angle will result in radial movement of the first gearwheel 16 during flank clearance setting and ensure the parallel movement of the first gearwheel. The threaded portion 48 has a pitch within the range 0.2 mm-2 mm, preferably within the range 0.5 mm-1.5 mm. Such a thread pitch results in very accurate flank clearance adjustment, since the magnitude of the pitch affects the axial movement of the turning spigot. The spigot's axial movement itself affects the parallel movement of the first gearwheel's first centerline 39.

The spigot's tip angle $\beta$ and thread pitch are preferably such that when it is turned 360° in the hole 36 the parallel movement of the first gearwheel's first centerline 39 will be within the range 1 μm-2 mm, preferably within the range 5 μm-1 mm. Such a tip angle and thread pitch result in very accurate flank clearance adjustment, since the magnitude of the pitch affects the axial movement of the turning spigot. The spigot's axial movement itself affects the parallel movement of the first gearwheel's first centerline 39.

Figure 5:
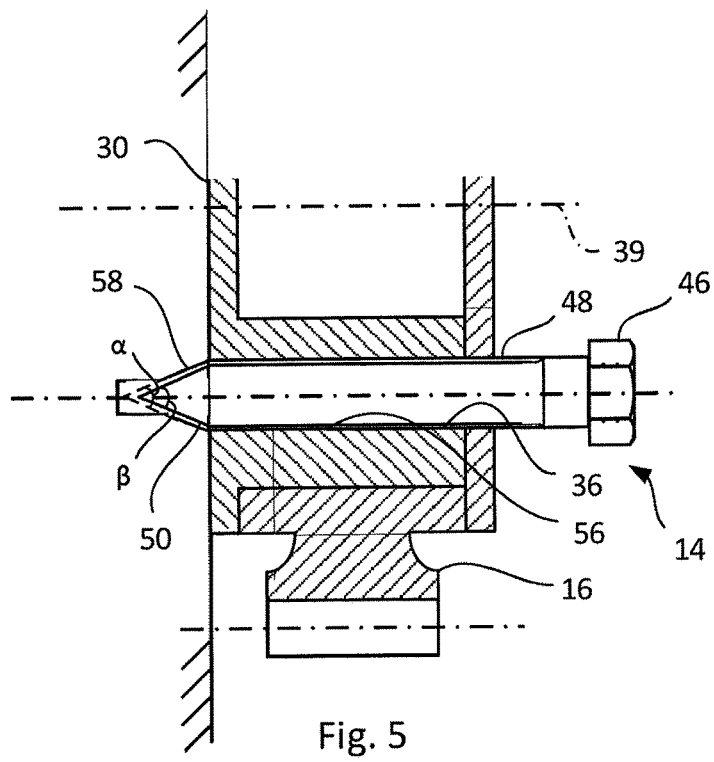
FIG. 5 depicts a sectional view of the clearance adjustment mechanism according to a second embodiment.

FIG. 5 depicts a sectional view of a clearance adjustment mechanism 14 according to a second embodiment. The hole 36 has an internal thread 56 arranged to cooperate with the spigot's threaded portion 48. This internal thread in the hole simplifies the manufacture of the clearance adjustment mechanism. The spigot's conical portion 50 is configured to cooperate, during the parallel movement of the first centerline 39, with a conical recess 58 in the frame element 30. The conical recess in the frame element and the internal thread in the hole simplify the manufacture of the clearance adjustment mechanism. The dimensions of the spigot's tip angle $\beta$ and the recess $\alpha$ correspond to the ranges defined with respect to the first embodiment above. The dimensions of the respective thread pitches of the spigot and the hole also correspond to the ranges defined with respect to the first embodiment above. The spigot's tip angle and thread pitch are preferably such that when it is turned 360° in the hole 36 the parallel movement of the first centerline 39 of the first gearwheel 16 will be within the range 1 μm-2 mm, preferably within the range 5 μm-1 mm.

Figures 6A, 6B:
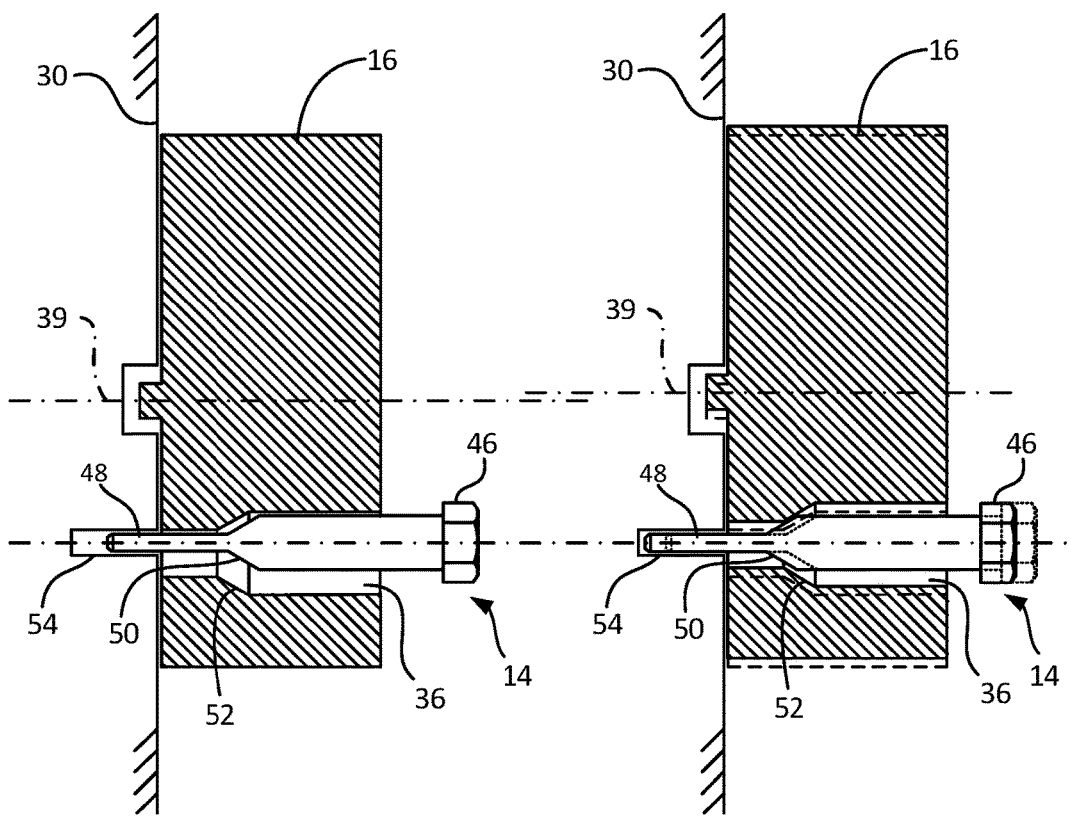
FIG. 6A depicts a sectional view of the clearance adjustment mechanism according to a further embodiment of the present invention in an unadjusted state.
FIG. 6B depicts a sectional view of the clearance adjustment mechanism according to a further embodiment of the present invention in an adjusted state.

FIGS. 6A and 6B depict sectional views of the clearance adjustment mechanism according to a further embodiment of the present invention in respectively unadjusted and adjusted states.

FIG. 6A depicts a sectional view of the clearance adjustment mechanism 14 in the further embodiment of the present invention, with constituent parts in positions corresponding to an unadjusted gearwheel 16. The hole 36 in the gearwheel is so situated relative to the threaded aperture 54 in the frame element 30 that there is scope for adjustment in desired directions. At this stage the spigot's conical portion 50 is not in contact with the conical step 52 in the hole.

FIG. 6B depicts a sectional view of the clearance adjustment mechanism 14 in a further embodiment of the present invention which is the same as in FIG. 6A but with constituent parts in positions corresponding to completed adjustment of flank clearance. Turning the spigot 46 in the hole 36 causes axial movement of the spigot as a result of the interaction between its threaded portion 48 and the threaded aperture 54 in the frame element 30. This axial movement applies the spigot's conical portion 50 to the conical step 52 in the hole 36 and the resulting interaction between them causes parallel movement of the gearwheel 16 and its centerline 39. The result is accurate flank clearance adjustment.

Figure 7:
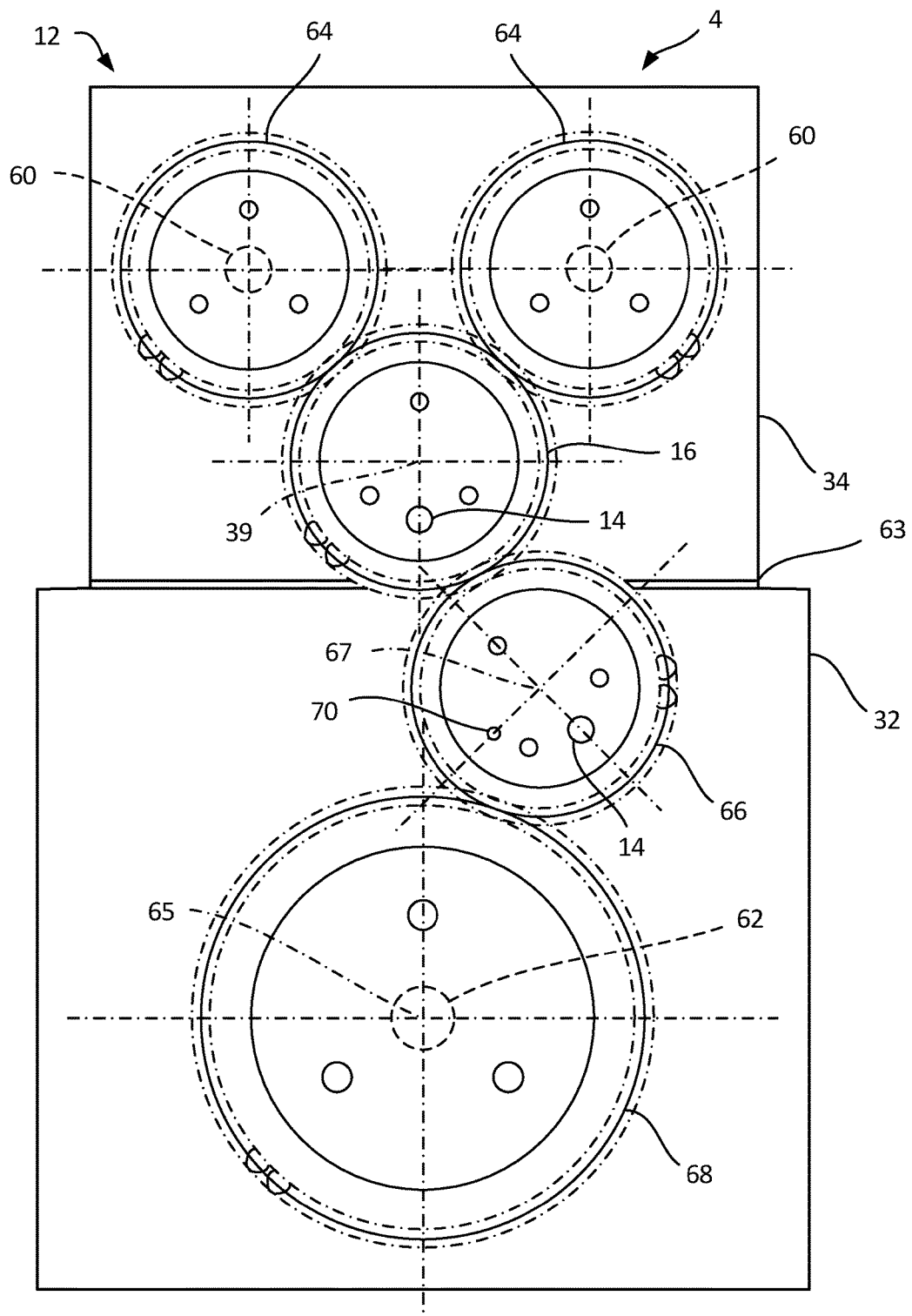
FIG. 7 depicts a plan view of a gearwheel transmission with a clearance adjustment mechanism according to the present invention.

FIG. 7 depicts a plan view of a gearwheel transmission 12 with a clearance adjustment mechanism 14 according to the present invention. The transmission 12 in FIG. 7 is configured for camshaft drive of the combustion engine 4. It comprises a number of gearwheels in mutual engagement. The engine has two overhead camshafts 60 and the distance between them and its crankshaft 62 is considerable. The transmission 12 between the crankshaft and the camshafts therefore comprises a number of gearwheels.

The crankshaft is fitted in the engine block 32 and the camshafts are fitted in the cylinder head 34. Owing to manufacturing tolerances of the engine block and the cylinder head and the gasket 63 situated between them, the distance between the crankshaft 62 and the camshafts 60 will vary between engines of the same type and make. This means that the center distances of the gearwheels will vary because the engine's components are manufactured with a certain tolerance. Compression of the gasket 63 may occur during operation of the engine. The engine's servicing and repair may entail replacement or reconditioning, e.g. by grinding, of the cylinder head. The center distances of the gearwheels may therefore change both during operation and as a result of servicing and repair of the engine.

In FIG. 7 the first gearwheel 16 is arranged to be adjustable between the gearwheels 64 of the respective camshafts 60. A third gearwheel 66 is arranged to be adjustable between the first gearwheel 16 and the gearwheel 68 of the crankshaft 62. This third gearwheel preferably has a clearance adjustment mechanism 14 according to the invention. A pivot pin 70 is arranged to extend through the third gearwheel 66 and parallel with its third centerline 67 so that this third centerline moves in parallel in a circular movement about the pivot pin when the clearance adjustment mechanism 14 moves the third gearwheel. During flank clearance adjustment, such a pivot pin causes the third gearwheel to move in a controlled direction, affecting the accuracy of the adjustment and making it possible for there to be different flank clearance adjustments relative to the first gearwheel 16 and the crankshaft gearwheel 68.

After adjustment of the flank clearance between the first gearwheel 16 and the camshaft gearwheels 64 by means of the first gearwheel's clearance adjustment mechanism 14, the respective clearances between the third gearwheel 66 and the first gearwheel 16 and the crankshaft gearwheel 68 are adjusted by means of the third gearwheel's adjustment mechanism 14. When this mechanism 14 moves the third gearwheel's third centerline 67 in a circular direction about the pivot pin 70, there will, owing to the position of the pivot pin relative to the third gearwheel's third centerline 67 and the crankshaft's fourth centerline 65, be different amounts of movement in the tooth engagement between the three gearwheels. This may be advantageous in the flank adjustment operation described, since a larger clearance adjustment is likely to be needed between the first and third gearwheels 16, 66 than between the third gearwheel 66 and the crankshaft gearwheel 68.

Figure 8:
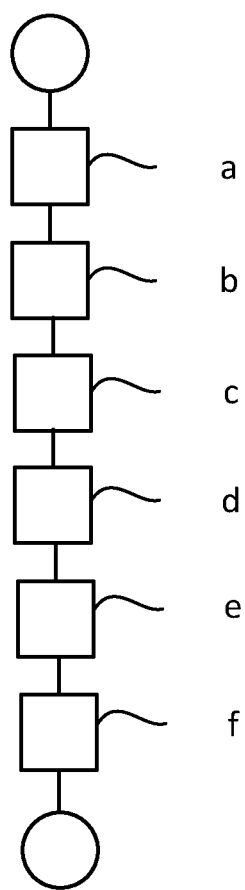

The flank clearance adjustment method according to the invention is illustrated in block diagram form in FIG. 8 and comprises step a) of inserting the spigot 46 in the hole 36 and step b) of turning it so that the first centerline 39 moves in parallel. Such a method results in very easy and accurate flank clearance adjustment which may be carried out with ordinary standard tools. At step c) a predetermined amount of torque is applied to the spigot, followed by a step d) of its being turned through a predetermined angle in the opposite direction to the torque applied, so that the first centerline 39 moves in parallel in the opposite direction to the preceding parallel movement. Easy and accurate flank clearance adjustment may thus be achieved with simple standard tools, e.g. a torque socket wrench. The parallel movement of the first centerline 39 in the opposite direction may be by force of gravity acting upon the first gearwheel 16 or by spring force from the spring device 51 (FIG. 3).

Finally, at step e) the first gearwheel 16 is fixed on a frame element 30 and at step f) the spigot 46 is removed from the hole 36. As the spigot is only to be used during flank clearance adjustment, it may be removed when the adjustment has been completed, reducing the weight of the transmission 12 and the frame element 30, e.g. a combustion engine 4, to which the transmission is attached.

Cited components and features cited above may within the scope of the invention be combined between different embodiments cited.

The invention claimed is:

1. A clearance adjustment mechanism for a gearwheel transmission, the transmission comprising:
   at least one gearwheel having a centerline; and
   a hole formed in the gearwheel radially set off from the centerline and running substantially parallel with the centerline, the hole having a conical step;
   a spigot configured for being insertable in the hole, the spigot having a conical portion along the spigot, a first portion adjacent the conical portion and terminating at one end of the spigot, and a second portion adjacent the conical portion and terminating at another end of the spigot,
   wherein the conical step in the hole is wider, along its entire axial length, than the conical portion to permit radial movement of the gearwheel relative to the conical portion when the conical portion is received in the hole, and wherein when the conical portion of the spigot is inserted into the hole and moved in the hole the conical portion of the spigot contacts and cooperates with the conical step of the hole to cause the gearwheel to move radially relative to the conical position, causing the centreline of the gearwheel to move radially and in parallel with the spigot when the spigot is moved in the hole.

2. A clearance adjustment mechanism according to claim 1, further comprising a pivot pin extending through the at least one gearwheel and parallel with the centerline, and configured so that the centerline moves in parallel in a circular movement about the pivot pin when the spigot is turned in the hole.

3. A clearance adjustment mechanism according to claim 1, wherein the conical step in the hole is configured to contact and cooperate with the conical portion of the spigot when the spigot is turned in the hole to cause the parallel movement of the spigot and the centerline.

4. A clearance adjustment mechanism according to claim 3, wherein the conical step in the hole has a tip angle ($\alpha$) which substantially coincides with a tip angle ($\beta$) of the conical portion of the spigot.

5. A clearance adjustment mechanism according to claim 3, wherein a threaded portion along the first portion of the spigot fits in a threaded aperture in a frame element on which the gearwheel is attachable.

6. A clearance adjustment mechanism according to claim 1, wherein the hole has an internal thread located and configured to cooperate with a threaded portion of the spigot such that rotation of the spigot moves the spigot axially and thereby moves the gearwheel and the centerline radially.

7. A clearance adjustment mechanism according to claim 6, further comprising a conical recess on which the gearwheel is attachable and the conical portion of the spigot is configured to cooperate, during the parallel movement of the centerline, with the conical recess.

8. A gearwheel transmission comprising a clearance adjustment mechanism according to claim 2.

9. A gearwheel transmission according to claim 8, configured to transfer torque and rotation from a crankshaft to at least one camshaft of a combustion engine.

10. A combustion engine comprising a gearwheel transmission according to claim 8.

11. A vehicle comprised of a combustion engine according to claim 10.

12. A method for adjusting the flank clearance in a gearwheel transmission wherein the transmission comprises at least one gearwheel with a centerline; and
a hole in the gearwheel running substantially parallel with the centreline and having a conical step, the method comprising the steps of:
a) inserting a spigot in the hole, the spigot having a first threaded portion, a second portion, and a conical portion, axially located along the spigot between the first threaded portion and the second portion, the conical step in the hole being wider, along its entire axial length, than the conical portion to permit radial movement of the gearwheel relative to the conical portion when the conical portion is received in the hole; and
b) turning the spigot around its axis in one direction when the conical portion of the spigot is in the hole and is in contact with the conical step to move the centerline in parallel with the spigot and to move the gearwheel radially relative to the conical portion.

13. A method according to claim 12, further comprising steps of:
c) applying a predetermined amount of torque to the spigot; and
d) then turning the spigot through a predetermined angle in an opposite direction to cause the centerline to move parallel in the opposite direction.

14. A method according to claim 13, further comprising:
e) fixing the gearwheel on a frame element, and removing the spigot from the hole.

15. A clearance adjustment mechanism according to claim 6, wherein the spigot also has a threaded portion and the hole also has a threaded portion positioned and configured to mesh with the threaded portion of the spigot; and
that rotation of the spigot causes the threaded portion of the spigot to engage the threaded portion of the hole and causes the spigot to move into or out of the hole, thereby to also cause the conical portion of the spigot contacting the conical step of the hole to move the spigot radially and to thereby move the gearwheel radially.

* * * * *